F. W. EAMES.
Vacuum-Brakes for Railway Trains.
No. 153,814. Patented Aug. 4, 1874.
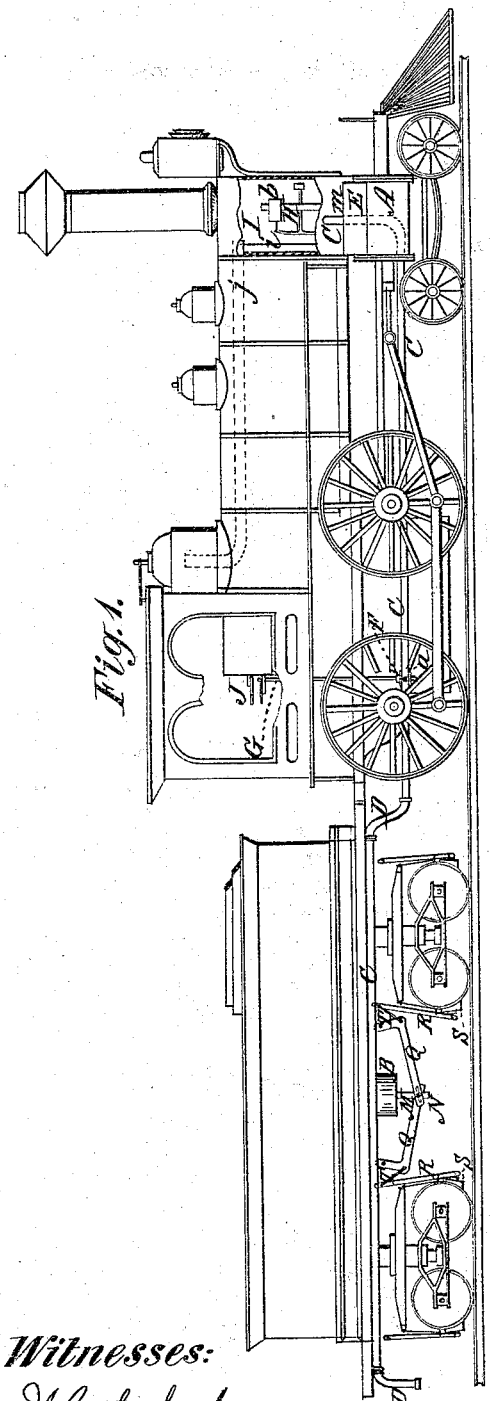
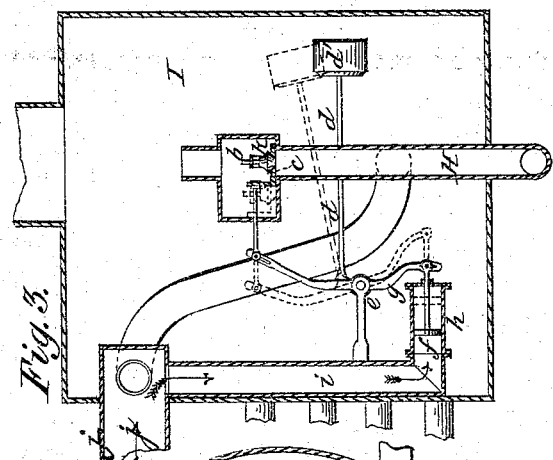
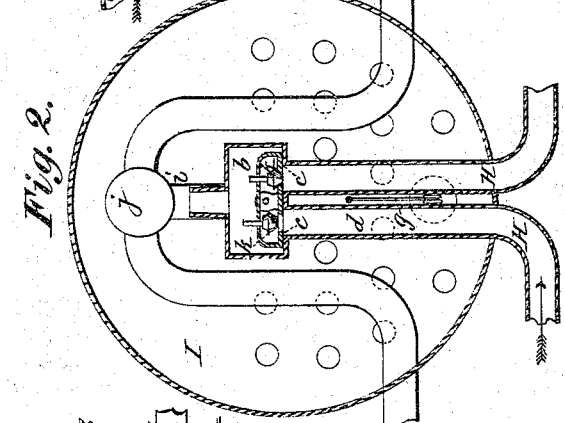
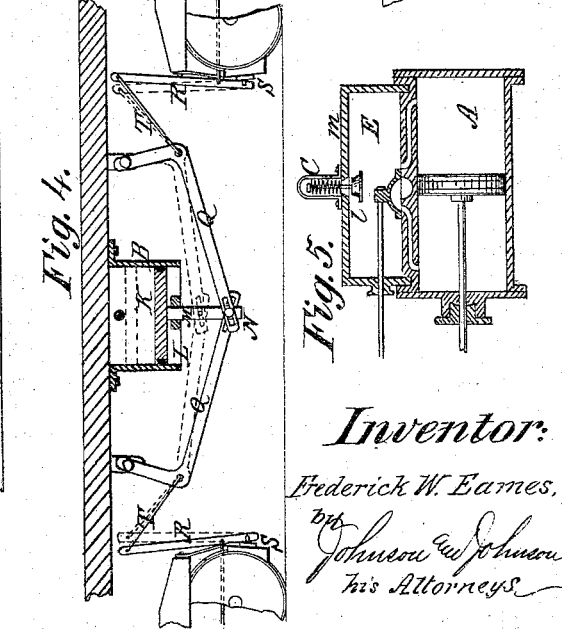
Witnesses:
Inventor:
Frederick W. Eames,
by Johnson and Johnson
his Attorneys

UNITED STATES PATENT OFFICE.

FREDERICK W. EAMES, OF WATERTOWN, NEW YORK, ASSIGNOR OF ONE-EIGHTH HIS RIGHT TO WILLIAM G. PIERCE, OF SAME PLACE.

IMPROVEMENT IN VACUUM-BRAKES FOR RAILWAY-TRAINS.

Specification forming part of Letters Patent No. 153,814, dated August 4, 1874; application filed January 29, 1874.

*T all whom it may concern:*

Be it known that I, FREDERICK W. EAMES, of Watertown, in the county of Jefferson and State of New York, have invented certain new and useful Improvements in Vacuum-Brakes for Railway-Trains, of which the following is a specification:

In railway-car brakes efforts have been made to utilize the steam-cylinders of a locomotive as air-pumps to produce a vacuum, or partial vacuum, in flexible cylinders or collapsing diaphragms located beneath the cars, in order to apply the pressure derived from the atmosphere to the brakes of the several cars by means of connecting-pipes throughout the train, and in which the force of the vacuum is presumed to be governed and applied to the brake-rods with a pressure regulated by the difference in the pressure of the atmosphere on the outside and inside of the collapsing-cylinders. As far as the state of the art discloses these attempts to apply the force of a vacuum by the direct means of the steam-cylinders as vacuum-creating pumps, they are practically inoperative to produce the desired results, for the reason that no provision has been made for closing the communication of the outer air with the steam-cylinder through the exhaust-steam pipes, which must always be open and uninterrupted when the engine is using steam. When, however, the steam is cut off to produce and apply the vacuum, the outer air will rush in through the exhaust-pipes, and instantly supply any vacuum which may be in the cylinders; and, if this be true, it is plain that such effect will prevent the obtaining and maintaining of a proper vacuum within the collapsing-cylinders, and the setting up of the brakes with sufficient force. Brakes have also been operated by the force of compressed air against a piston within a vertical cylinder closed at the bottom, and in which the piston-rod passes through a stuffing-box, and is connected to the brake-rods, so as to draw upon the brakes. In such device the piston is operated by the air compressed by the steam-cylinders when the steam is cut off and the engine is reversed, and although I employ a vertical cylinder and piston, yet the force which operates such piston is that of a vacuum within the cylinder, and is essentially different from the application of compressed air.

The chief object and purpose of my invention is to render the force of vacuum practically operative as a braking-power for railway-trains, and to put this power in force by the steam-cylinders of the locomotive. To this end, the invention which constitutes the subject-matter of this patent consists, first, in the combination, in a vacuum braking mechanism for railway-cars, of the steam-cylinders with the exhaust-pipe valve or valves of a locomotive-engine, and the pump-connecting pipe and the valve therein of the car-brake mechanism, whereby the said exhaust-pipe valves serve the highly-important function of opening and closing the exhaust-pipes to prevent the outside air from being drawn into the cylinder, and to allow the air which is drawn from the vacuum-cylinders of the brakes to be expelled at the proper time from the steam-cylinders, and obtain thereby an alternately open and closed exhaust-pipe connection with the steam-cylinders, which, in effect, seals the cylinders to prevent the supplying of the vacuum through the exhaust-pipes, as without the element of the valve or valves in this combination the steam-cylinders would have a perpetual communication with the outer air, and thus prevent the formation and maintaining of an effective vacuum; second, in the combination, in a vacuum-braking mechanism for railway-trains, of a combined slide and poppet-valve with the exhaust-steam pipe, the cylinders of a locomotive, a valve in the pump-pipe, and a braking mechanism, whereby the said exhaust-pipes may have an unobstructed passage for the exhaust when the engine is using steam, and such communication be closed when the cylinders are converted into air-pumps to produce the required vacuum; third, in the combination, in a vacuum braking mechanism, of an automatic valve or valves operating by the pressure of the steam when let into the cylinders, to uncover the exhaust-pipes and to close said pipes when the steam is shut off by a weight or spring, in order to set in force the vacuum; fourth, in the combination, in a vacuum braking mechanism in which the power is obtained direct from the steam-cylinders, of a valve or valves in the exhaust-pipe with a three-way cock in the air-pipe, the steam-cylinders, and the vertical connected vacuum-brake cylinders of the train, whereby, when the steam is cut off, and it is not desirable to use the brakes, the communication between the cylinders and the brakes may be kept closed, to prevent the power from being applied as soon as the steam is cut off, unless it may be desirable to do so, in which case the vacuum may be applied, continued, or released, as the legitimate result of the employment in this combination of the exhaust-pipe valves; fifth, in the combination, with a vertically-operating piston in a vacuum-cylinder, of levers connected by a free joint or jointed levers and the brakes, whereby the vertical movement of the piston-rod is uninfluenced by any unequal draft upon the brakes or levers, or any unequal adjustment of the same, and render the connection of each pair of brakes entirely independent of the other in operation, so that in the event of the breaking or disconnection of one from the vacuum motor the other will remain intact for instant and effective action.

In the accompanying drawings, Figure 1 represents a side elevation of a locomotive and tender, illustrating the application of my vacuum-brake, a portion of the smoke-box being broken away to show the connection of the exhaust-pipe valves with the steam-pipe and cylinders. Fig. 2 represents a cross-section of the smoke-box, enlarged to show more clearly the exhaust-pipe valves; Fig. 3, an enlarged section of the same, showing the exhaust-valves closed when steam is cut off to apply the brakes under vacuum. Fig. 4 represents an enlarged section of the vertical vacuum-cylinder and its connection with the brake-levers, and Fig. 5 the valve in the steam-chest.

The locomotive-cylinders A are converted into air-pumps to produce the vacuum, by the force of which the brakes are applied, and it is the production and maintenance of as perfect a vacuum as possible by means of the engine-cylinders that my invention is designed to accomplish. Each car and the tender of the engine is provided with a vertical cylinder, B, beneath the body of the car, wherein the force of the vacuum is exerted, and these are connected directly to the engine-cylinders by a pipe, C, connected between each car by a flexible tube, D, whose connections are made and rendered air-tight in the usual manner. This air-pipe C extends throughout the train, and is closed at its rear end, while its front end is connected with the top of the steam-chests E by branches, in order that when the vacuum is created it shall be maintained by the joint action of both cylinders. The vacuum-pumps are brought into action by a three-way cock, F, placed within the air-pipe C, and controlled by the engineer at G, to bring the engine-cylinders and the vacuum-cylinders in communication to apply the brakes, or close the communication between these parts, to hold the vacuum already obtained; or to open the communication between the vacuum-cylinders and the outer air, to destroy the vacuum and release the brakes, the latter being accomplished through a side opening, $a$, in the air-pipe; while the other two operations are effected by opening and closing a through-way of the cock. The organization or combinations of these parts will not produce and maintain an effective working vacuum. To do this, therefore, is one of the things which distinguishes my invention from others. This I do by the employment of a valve or valves in the exhaust-steam pipes, for joint action, not only with the cylinders, as vacuum-pumps, but as steam-cylinders, and also with the valve in the steam-chest and the cock in the air-pipe. This combination and its operation I will now proceed to describe. The exhaust-pipes H enter a chamber, $b$, which, for convenience, I prefer to arrange within the smoke-box I, and within this chamber I arrange a valve, $c$, which, in its normal condition, covers the orifices of the exhaust-pipes H, and prevents the outer air from entering the cylinders, and thereby seals the cylinders to prevent the destruction of the vacuum through the exhaust-pipes. This valve is moved to this position and there held by means of a weighted lever, $d$, pivoted to a fulcrum, $e$, in the smoke-box; and in this respect its function is rendered absolute as soon as the steam is cut off. When, however, the steam is admitted to the cylinders, this valve $c$ is drawn back to uncover the exhaust-pipes H, by the direct pressure of the steam upon a small piston, $f$, connected to a branch, $g$, from the weighted lever $d$; the said piston working in a cylinder, $h$, connected by a branch pipe, $i$, to the steam-pipe $j$ of the locomotive; and as to this action of the valve, it is rendered certain by opening the throttle-valve J, so that the escape of the steam from the engine-cylinders will be free and unobstructed. The movement of the valve $c$ to either position is effected automatically, the weight $d'$ closing it, and the steam opening it against the gravity of the weight, and the closing function is adapted solely to prevent the entrance of the outer air through the exhaust-pipes.

In order, however, to permit the escape of the air which is drawn from the vacuum-cylinders B under the cars, I combine with this valve $c$ two small poppet-valves, $k\ k$, carried by it and in positions to be brought directly over the exhaust-orifices as soon as the steam is cut off, in which positions they are alternately raised to allow the escape of the air pumped from the vacuum-cylinders. These poppet-valves $k$ fit over openings in the slide-valve $c$, and they open and close with the strokes of the pistons, to let out the air from the one stroke and to prevent its being sucked in by the other, whereby the vacuum is made and maintained, because during this operation the communication of the outer air with the cylinders is effectually destroyed, while without such device, or its equivalent, the vacuum cannot be created or maintained by the steam-cylinders as vacuum-pumps. The steam-cylinders, acting as vacuum-pumps, are provided with poppet-valves $l$, Fig. 5, located upon the under side of the steam-chest covers $m$, directly beneath the intersection therewith of the air-pipe C, and which constitute the foot or induction valves of the vacuum-pumps, while the exhaust-pipe valves $k$ form the eduction-valves for the same; and they operate jointly in performing their respective offices in connection with a vacuum-brake. The vacuum-cylinders B are secured to the under sides of the cars, and are closed at their upper ends, and having piston-heads K properly packed working within them, while their lower ends L are sufficiently open to allow of the free action of the outer air against the under sides of the pistons, such construction of the cylinders being for the purpose of applying the brakes by the force of a vacuum within the cylinders above the piston-heads and the action of the outer air upon the piston, and at the same time allow the piston to drop instantly by its own gravity when the vacuum above it is destroyed, thereby effecting a positive and certain instantaneous release of the brakes at the will of the engineer, and dispensing with the employment of any devices for compelling the descent of the pistons to release the brakes. The stem M of this piston is connected by a free joint, N, or a jointed lever, to the levers Q, for operating the brake-rods R, for the purpose of obtaining a direct vertical strain upon the piston-rod M, no matter how unequal the pressure may be upon each pair of brakes by reason of unequal movement or adjustment, and by which one pair of brakes, S, may be operated independently of the other in the event of the breakage or derangement of the other pair of brakes or their connecting parts, as the action of one pair of brakes operated by one lever, by the piston, is as perfect as that of both. This free connection of the brake device is obtained in the example shown by slotting the contiguous ends of the suspended levers Q; but such connection with the piston-stem M may be made by short jointed links or rods, or in any manner that will produce the same result. These connected levers Q are pivoted to the car-body by their short arms, and they are connected to the brake-levers R by link-rods T, extending from their elbows to the upper ends of said brake-levers R, the lower ends of which are attached to the brake-bars S.

A very great advantage in the use of the open-bottom cylinder is that in its connection with the piston K and levers Q no stuffing-boxes are required, as the force of the vacuum is applied above the piston.

In applying the brake, when it is desired to stop the train the throttle-valve J is closed, and the exhaust-pipe valve $c$, which has been held open heretofore by the pressure of the steam on the small piston $f$, is now drawn forward over the exhaust-orifices by the weighted lever $d$, to which it is attached, to close said orifices, which, sealing the steam-cylinders, produces a nearly perfect vacuum therein. The three-way cock F is now turned, which opens communication between the vacuum-producing engine-cylinders A and the brake-cylinders B of each car, the air in which is immediately drawn out, which causes the pistons K to ascend, and thereby set up the brakes with a pressure due to the difference between the outer and inner atmosphere, and thereby stop the train. The three-way cock F is now turned sufficiently to close the communication between the above-named cylinders, and by this means retain the vacuum in active force to hold the train in the event of the stoppage of the train upon a grade.

In again starting the train, the three-way cock F is still further turned till it opens the communication between the vacuum-brake cylinder B and the outer atmosphere, which, rushing into the air-pipe through the lateral opening $a$ in said pipe, immediately destroys the vacuum, when the vertical pistons K instantly fall by their own gravity and release the brakes. The throttle is now opened, when the pressure of the steam is exerted upon the small piston $f$, which, by its connection with the exhaust-pipe valve, draws it from over the exhaust-orifices to allow the cylinders to work with steam the same as if there were no valves in the exhaust-pipes.

I claim—

1. The combination, in a vacuum braking mechanism for railway-trains, of the steam-cylinder A with the exhaust-pipe valve $k$ or valves of a locomotive-engine and the pump-connecting pipe C and the valve therein, of the car-brake mechanism, substantially as described.

2. The combination, in a vacuum braking mechanism for railway-trains, of a combined poppet and slide valve, $c$ $k$, with the exhaust-steam pipes H, the cylinders of the locomotive-valve $l$, and a braking mechanism, substantially as described.

3. The combination, in a vacuum braking mechanism for railway-trains, of a slide-valve, $c$, and poppet-valves $k$ for opening and closing the exhaust-pipes H, with the steam-pipe $j$, of the locomotive-piston $f$, and weighted lever $d$, and the steam-cylinder A, substantially as and for the purpose described.

4. The combination, in a vacuum braking mechanism for railway-trains, in which the power is obtained direct from the steam-cylinders, of a slide-valve, $c$, poppet-valves $k$ in the exhaust-pipes H, with a three-way cock, F, in the air-pipe C, the steam-cylinders A, and the vertical vacuum-brake cylinders B of the train, substantially as and for the purposes described.

5. The combination of a vertically-operating piston, K, in a vacuum-cylinder with a free or jointed connection, N, of the piston-rod M, and the brakes S, substantially as and for the purpose described.

FREDERICK W. EAMES.

Witnesses:
A. E. H. JOHNSON,
J. W. HAMILTON JOHNSON.